Nov. 7, 1967   B. A. SAWYER   3,350,947
DENSITY CONTROLLED FLOATED GYRO
Original Filed Sept. 4, 1962   3 Sheets-Sheet 1
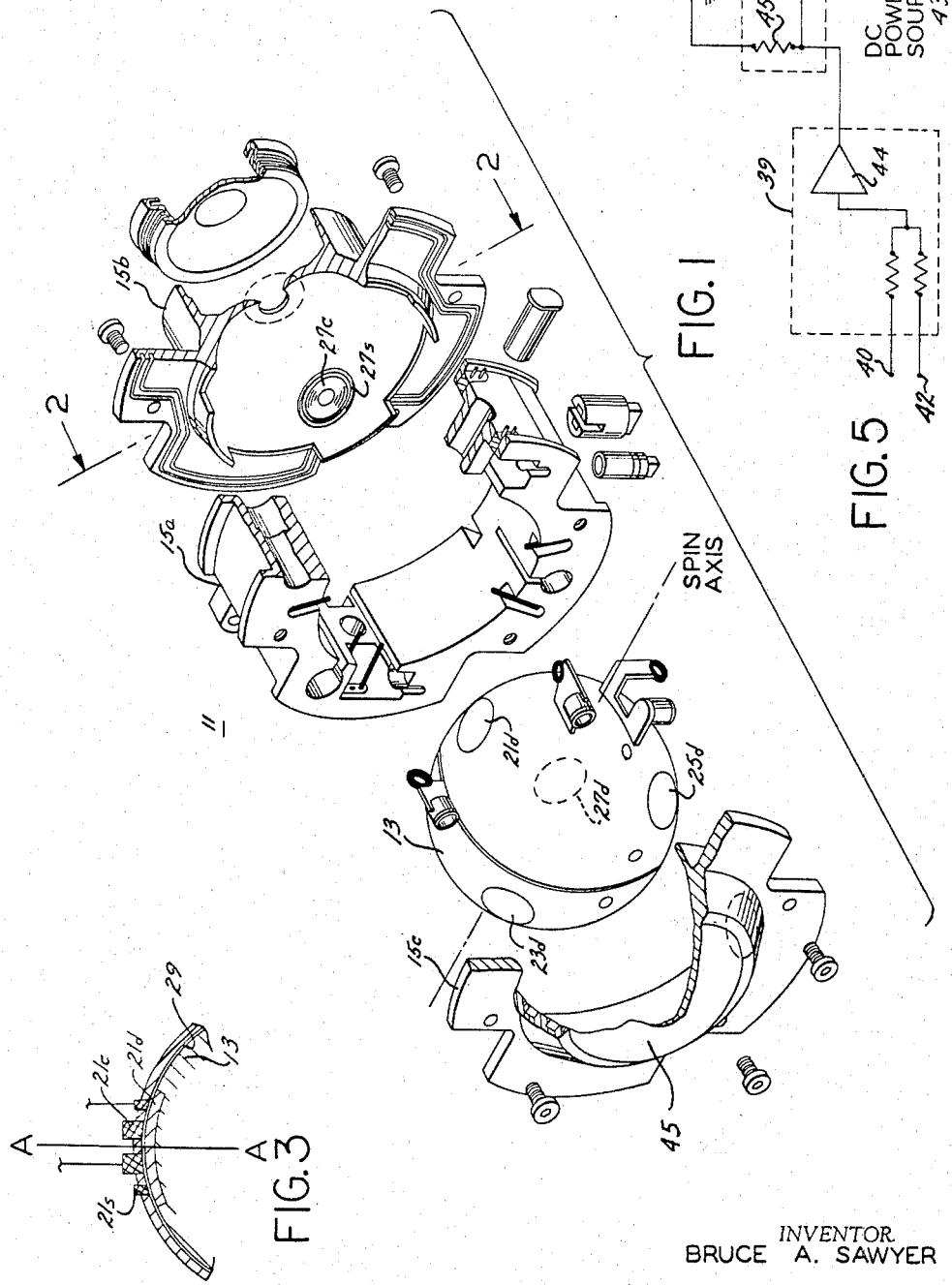
INVENTOR.
BRUCE A. SAWYER
Ernest L. Brown
ATTY.

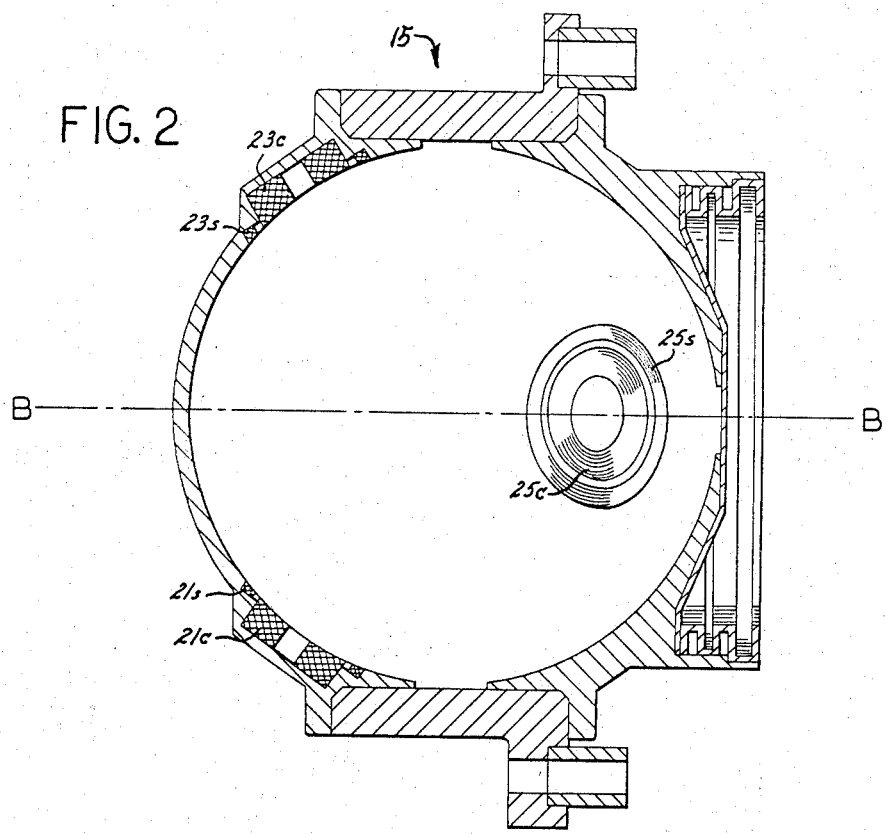

BRUCE A. SAWYER
INVENTOR.

United States Patent Office 3,350,947
Patented Nov. 7, 1967

3,350,947
DENSITY CONTROLLED FLOATED GYRO
Bruce A. Sawyer, Los Angeles, Calif., assignor to Litton Systems, Inc., Beverly Hills, Calif.
Continuation of application Ser. No. 221,203, Sept. 4, 1962. This application Mar. 11, 1965, Ser. No. 440,070
14 Claims. (Cl. 74—5.41)

This application is a continuation of patent application Ser. No. 221,203, filed Sept. 4, 1962 by Bruce A. Sawyer for a "Density Controlled Floated Gyro," now abandoned.

The present invention relates to a compensated floated gyroscope, and more particularly to a compensated gyroscope wherein departures from neutral buoyancy are compensated for by changing the temperature of the flotation fluid to obtain neutral buoyancy and by exerting a compensating force on the gyro float unit to maintain the proper positioning of the gyro float until the flotation fluid temperature is changed to the neutral buoyancy temperature.

From a lay point of view, practically all gyros employed as control instruments are generally considered as precision devices. However, the relatively recent concept of employing inertial auto-navigators in guidance systems for controlling sustained flight of aircraft has brought forth a need for ultra high precision gyros since sensitivity and accuracy must be several orders of magnitude greater than of pre-existing gyros.

Since the realization in the art of a need for these truly precise gyros was recognized, much effort has been expended in attempts to perfect a truly ultra precision gyro. It was discovered at a very early date, by those involved in developing an ultra-precision gyro that one of the most serious bottlenecks in developing a highly accurate gyro was associated with the bearing structures utilized to pivotably connect the gyroscope to its outer case. In an attempt to overcome these problems, considerable time has been spent by those skilled in the art in developing jewel-and-pivot bearing for mounting the gyroscope to the outer case. However, it became apparent that bearings of even reasonably high accuracy are inherently of such a delicate nature that they could not support even a fraction of the weight of the gyroscope while, on the other hand, those bearings capable of supporting the weight of a gyroscope did not have sufficient accuracy to be used in the mechanization of an ultra-precision gyroscope.

In an attempt to overcome this dilemma, gyroscope structures were developed with the gyroscope float element floated in a flotation fluid having a density such that the gyroscope float element is at substantially neutral suspension. Hence, the bearings used to couple the gyroscope float element to the gyro outer case are utilized only as alignment guides and not as structure to support the weight of the gyroscope float element. By this technique much higher accuracy gyroscopes could be mechanized.

However, while the technique of floating the gyroscope float permitted the mechanization of gyroscopes having accuracies substantially greater than what was previously known in the art, the accuracy of even the floated gyroscopes falls short of that needed in certain applications where extremely high ultra-precision gyroscopes are needed. More particularly, even the finest jewel-and-pivot bearings exhibited sufficient friction and bearing end play to limit the accuracy of the gyroscope.

The present invention, on the other hand, obviates the above and other disadvantages of the prior art precision gyroscopes by providing a floated ultra-precision gyroscope wherein deviation of the gyroscope float from neutral buoyancy is sensed and the flotation fluid temperature is changed in accordance with the deviation to return the gyroscope to neutral buoyancy. In addition, other neutralizing forces are exerted upon the gyroscope float in accordance with its deviation from neutral buoyancy to cancel any movement of the gyro float which might otherwise occur as a result of the forces exerted thereon because of the deviation from neutral buoyancy. More particularly, upon deviation of the gyroscope float from neutral buoyancy action is taken to change the temperature of the flotation fluid to eliminate the deviation and at the same time other neutralizing forces are applied to the gyroscope float to check any movement of the gyroscope float due to the deviation from neutral buoyancy which might occur before the flotation fluid temperature can be completely adjusted to eliminate any deviation from neutral buoyancy. Hence, the positioning of the gyroscope float can be assured without the use of gimbal rings. Hence, the limitation upon prior art gyroscopes resulting from gimbal bearing friction and bearing end play are completely eliminated.

In one embodiment of the invention a two-degree-of freedom floated gyroscope includes an electromagnetic suspension system having four electromagnetic force generating elements arranged in a tetrahedral pattern and whose operation is controlled by a thermal centering servo system. In this manner, the accurate positioning of the float, which is a rotor-and-motor assembly can be maintained within the gyro housing without recourse to mechanical linkages, such as gimbal rings.

More particularly, the thermal centering servo system is operable to sense translational motion of the gyro float assembly and to actuate the appropriate magnetic forcer unit to exert a force on the rotor-and-motor assembly to return it to its initial position. In addition, a heater positioned symmetrically around the float within the flotation fluid is actuated by the servosystem in response to motion of the float along the gyro vertical to heat the flotation fluid for adjusting the density thereof. In this manner the float is returned to neutral buoyancy and maintained in its initial position without the necessity of continually applying other forces to the float. Hence, deviation of the gyro float from neutral buoyancy is sensed by motion of the float from its initial position by the servosystem which actuates the magnetic forces to return the float to its initial condition until the heating coil can adjust the temperature of the flotation fluid to return the float to neutral buoyancy.

It is, therefore, an object of the present invention to provide a precision gyro wherein limitations on the accuracy of the gyro due to gimbal bearings are completely eliminated.

It is another object of the present invention to provide a floated precision gyroscope wherein the temperature of the flotation fluid is automatically adjusted to maintain the gyroscope float in neutral buoyancy.

It is a further object of the present invention to provide a precision two-degree-of-freedom gyroscope wherein gimbal bearing errors are completely eliminated by maintaining the gyroscope in neutral buoyancy.

It is another further object of the present invention to provide a precision floated gyroscope wherein a non-mechanically connected gyro float is maintained properly positioned even when the float is not in neutral buoyancy by sensing deviation from neutral buoyancy and applying a corrective force to the floated element until the temperature of the flotation fluid can be adjusted to return the float to a neutral buoyancy.

It is still a further object of the present invention to sense deviation of a gyro floated element from neutral buoyancy by sensing movement of the floated element and to adjust the temperature of the flotation fluid to return the float to neutral buoyancy.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

FIGURE 1 is a three-dimensional exploded view of the two-degree-of-freedom floated gyroscope mechanized in accordance with the concepts of the present invention;

FIGURE 2 is a sectional view of the housing of the gyroscope of the invention;

FIGURE 3 is a fragmentary view of a portion of the gyroscope housing and float of the present invention;

FIGURE 5 is a block diagram of a fluid density control servo of the present invention.

Figure 4:
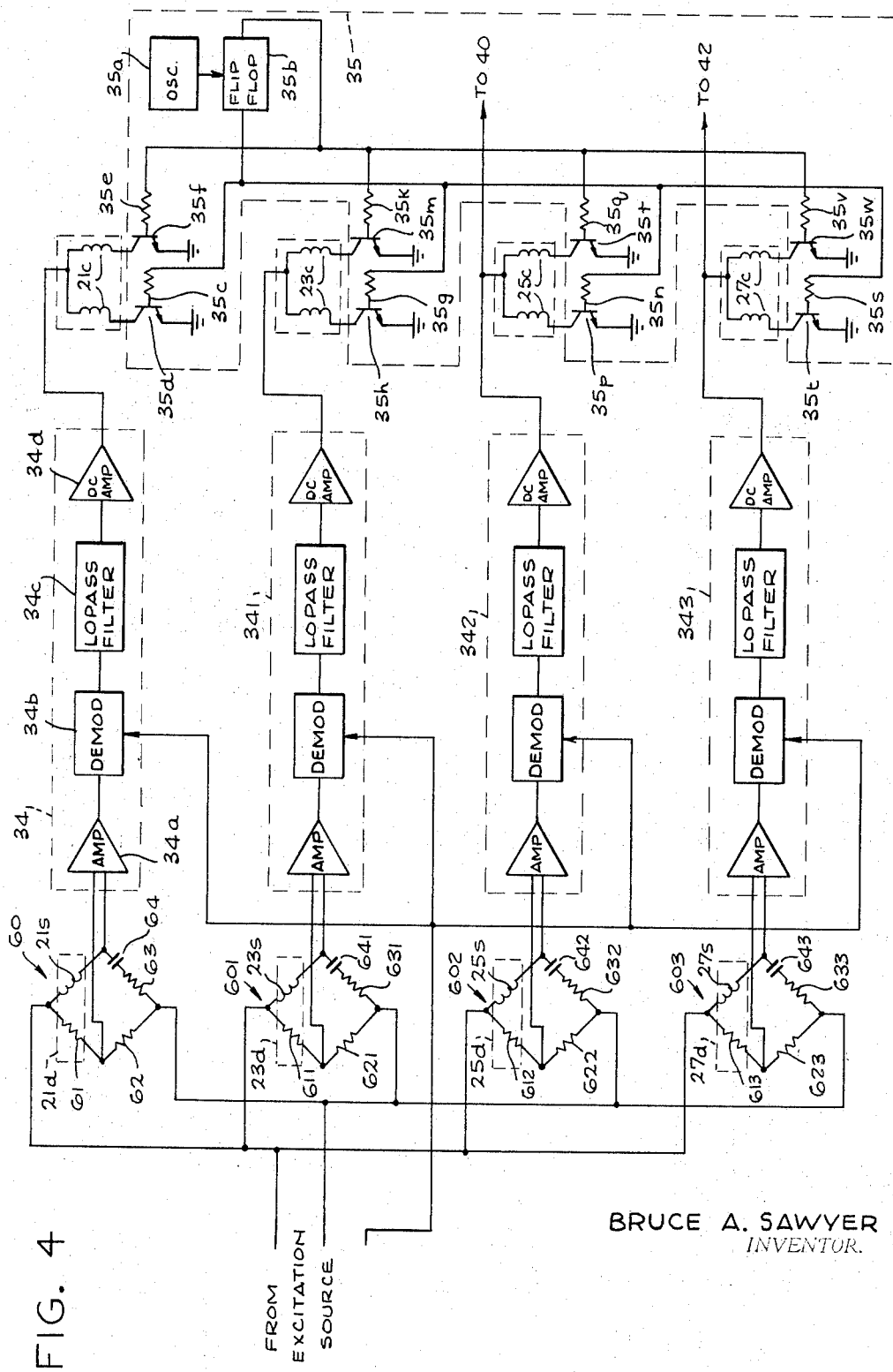
FIGURE 4 is a partly block, partly circuit diagram of a gyro centering system of the present invention.

Referring now to the drawings wherein like corresponding parts are designated by the same reference characters throughout the several views, there is shown in FIGURE 1 an exploded three-dimensional view of a floated two-degree-of-freedom gyroscope 11 including a floated rotor-and-motor assembly 13 which is positioned upon assembly within a cavity of a gyro case or housing 15 formed by a plurality of three (3) members 15a, 15b, and 15c. In accordance with the present invention, float assembly 13 is supported and centered within the case cavity by the buoyant force of a flotation fluid 29, shown in FIGURE 3, in conjunction with an electromagnetic suspension system. In this regard, it should be noted that assembly 13 includes, in contrast to a gimbaled gyroscope float assembly, torquing apparatus for torquing the assembly so that during gyro start up the float assembly can be prevented from commencing to rotate with the gyro rotor.

Referring now to the electromagnetic suspension system, attention is directed to FIGURE 2 wherein there is shown a sectional view of gyroscope case 15 indicating the nature and orientation of the electromagnetic system. More particularly, as is shown in FIGURE 2, the electromagnetic suspension system includes a plurality of four electromagnetic force generating and sensing elements, 21, 23, 25, and 27, the electromagnetic force generating portion including a ferromagnetic spherical segment attached to the gyro-float, and designated with a subscript $d$ after the appropriate numeric character and an associated coil affixed to the gyro case and designated with a subscript $c$. Each sensing portion comprises a sensing coil, designated with a subscript $s$, wound concentrically with the forcing coil. However, since the gyroscope float is not shown in FIGURE 2, only the coil element of each of the electromagnetic force generating elements and the sensing coils are depicted in the figure. As is shown in FIGURE 2, the forcing coils are affixed to the case with their axes radially oriented with respect to the center of case 15 so that upon application of a DC signal to the coil a radially oriented magnetic field is generated.

With reference to the case mounted coils, attention is directed to FIGURE 3 wherein there is shown a fragmentary sectional view of gyroscope 11 disclosing one of the electromagnetic forcing and sensing elements including the coil members which for ease of description is considered as element 21. However, the element is typical of any one of the four elements. As is shown in FIGURE 3, float 13 is floated within a flotation fluid 29 and has a ferromagnetic spherical segment 21d attached thereto in such a fashion as to be in register with its associated coil 21c. As will be apparent to one skilled in the art, since the ferromagnetic spherical segment is of high permeability, the magnetic field generated by coil 21c induces a polarity in magnetic spherical segment 21d so that the spherical segment is attracted to coil 21c whereby a force is exerted on float 13 tending to position the float closer to the coil. As is further indicated in FIGURE 3, an AC pick-up or sensing coil 21s is case mounted coaxially with the forcer coil 21c, the sensing element being designated by the subscripts along with the numeric character of the forcing element to which the sensor is associated. In operation, sensing coil 21s senses translational motion of the float member along its axis A—A which is, of course, radially oriented, and generates an AC signal representative of this motion. As will be hereinafter described in detail, the information generated by sensing coil 21s, 23s, 25s, or 27s is applied to coil 21c, 23c, 25c, or 27c, respectively whereby appropriate forces are exerted on the float element to return the float element to its initial or centered position.

Referring now to FIGURE 4, sensing coils 21s, 23s, 25s, and 27s each comprises part of a Hay-bridge, 60, 601, 602, and 603, respectively, excited by an AC suppressed carrier signal source (not shown). The carrier signal is modulated by each sensing coil in accordance with the movement of the gyro float 13. The modulated suppressed carrier signal generated by each Hay inductance bridge 60, 601, 602, and 603 is applied to a gyro centering amplifier 34, 341, 342, and 343, respectively, to generate DC driving signals by demodulating and amplifying the carrier signals. The DC driving signals are applied by centering amplifiers 34, 341, 342, and 343 to the electromagnetic forcer coils 21c, 23c, 25c, and 27c, respectively, whereby a force is exerted on the floated element 13 in accordance with its displacement relative to sensing coils 21s, 23s, 25s, and 27s, respectively. It should be noted that since magnetic attraction is used as a means of applying forces to the gyro float 13, the forcing elements 21c, 23c, 25c, and 27c, respectively, will only vary the magnetic attraction of each forcing coil, 21c, 23c, 25c, and 27c inversely with displacement of the float member 13 away from the particular forcing coils 21s, 23s, 25s, and 27s. However, as will be hereinafter explained, due to the tetrahedral arrangement of the four forcing units, the independent operation of each forcing element to exert a force on the gyro float member to compensate for movement of the float is sufficient to maintain the float centered within the case cavity.

Each gyro centering amplifier 34, 341, 342, and 343 comprises an amplifier, such as 34a, connected across the output terminals of each bridge 60, 601, 602, and 603, respectively, with its output terminal connected through a demodulator, such as 34b, and a low pass filter, such as 34c, to the input terminals of a DC amplifier, such as 34b. The excitation source (not shown) which excites bridges 60, 601, 602, and 603 is also connected to each of the demodulators of the centering amplifiers 34, 341, 342, and 343, such as demodulator 34b, as a reference signal.

The bridges 60, 601, 602, and 603, each comprises a pair of resistors 61 and 62, 611 and 621, 612 and 622, and 613 and 623, respectively, in two of its branches; a resistor 63 in series with a condenser 64, a resistor 631 in series with a condenser 641, a resistor 632 in series with a condenser 642, and a resistor 633 in series with a condenser 643, respectively, in a third branch; and the sensing winding 21s, 23s, 25s, and 27s, respectively, in the fourth branch.

As is further show in FIGURE 4, each electromagnetic forcer coil is driven at its center tap so that in cooperation with the operation of a forcer reverse switch circuit 35, each side of each forcer coil is alternately switched to ground whereby any errors that otherwise might be induced due to the effects of flux retentivity in the ferromagnetic spherical segment of the float is eliminated. More particularly, forcer reverse switch circuit 35 alternately switches each leg of each magnetic forcer coil open and closed to connect each coil to ground potential in an alternate fashion.

In the forcer reverse switch circuit 35, an oscillator 35a is connected to control the frequency of switching of flip-flop 35b. One of the electrical output connections of flip-flop 35b is connected to the bases of transistors 35d, 35h, 35p, and 35t through resistors 35c, 35g, 35n, and 35s, respectively. The second electrical output connection of flip-flop 35b is connected to the bases of transistors 35f, 35m, 35r, 35w, through resistors 35e, 35k, 35q and 35v, respectively. The alternation of the output voltages of flip-flop 35b alternately causes the collector-emitter path of the transistors to conduct and not to conduct. When one of the transistors conducts, the portion of the forcer coil 21c, 23c, 25c, or 27c to which it is connected conducts, and when the particular transistor collector-emitter path is opened, the portion of coil 21c, 23c, 25c, and 27c to which it is connected does not conduct.

Referring now to the overall operation of the four electromagnetic force generating elements, or forcers, as is indicated in FIGURE 2, forcers 21 and 23 are positioned 55 degrees removed from and on either side of plane B—B which bisects the case. In addition, forcers 21 and 23 are in turn bisected by a plane orthogonal to plane B—B as is further shown in FIGURE 2. Forcing elements 25 and 27 are bisected by plane B—B and are 55 degrees removed from and on either side of the plane bisecting elements 21 and 23. As will be apparent to one skilled in the art, the centers of the four forcing elements thus define the four corners of a tetrahedron. More important, because of the tetrahedral arrangement, movement of the gyroscope float element toward any one of forcing elements can be sensed by and compensated for by the cooperative action of the other three forcing elements, each operating independently.

Continuing with the discussion of the invention, the flotation fluid should be selected for high density and high thermal conductivity, low viscosity and exceptional chemical stability. More particularly, the density of the flotation fluid should be equal to that of the average float density at the operating gyro temperature. In addition, the flotation fluid should remain fluid over the entire range of operating temperature as well as storage temperature. While numerous fluids presently available satisfy the foregoing requirements, bromotrifluoroethymene has been found to operate quite satisfactorily as a flotation fluid.

As has been heretofore mentioned the flotation fluid density varies with changes in temperature of the flotation fluid so that the gyro float is in neutral buoyancy or, in other words, the mass of the fluid displaced by the float is just exactly equal to the weight of the mass of the float at only one temperature. Accordingly, deviations in the flotation fluid temperature will vary the buoyant force exerted on a gyro float element. If then, the force exerted on the gyro float by the electromagnetic forces is monitored and the temperature of the flotation fluid is varied to minimize these forces, the flotation fluid temperature will be adjusted to bring the float into almost exact neutral buoyancy.

Continuing with the discussion of the invention, there is shown in FIGURE 5 a gyro flotation fluid density control circuit which comprises an amplifier element 39 and a heater circuit 41. As is indicated in FIGURES 4 and 5, amplifier circuit 39 is responsive to signals from the gyro centering amplifiers 342 and 343 of forcing elements 25 and 27 since, as has been heretofore mentioned, line B—B is vertically oriented. More particularly, the outputs of the two gyro centering amplifiers are applied to a pair of terminals 40 and 42, respectively. As is shown in FIGURE 5, the two signals are then summed and amplified by amplifier 44 of amplifier circuit 39 and applied to the resistive element 45 of the heater circuit 41. Accordingly, as is indicated in FIGURE 5 the signal from amplifier 44 is applied to heater 45 concurrently with the constantly applied scaled signal from a DC source 43 for reasons which will be hereinafter discussed.

Considering now the overall operation of the gyro flotation fluid density control circuit, it should be noted that while for ease of understanding, the operation is described in a step by step manner that in accordance with the invention the circuit is a continuous proportional servo and all of the described steps occur concurrently and continuously. Continuing with the description of operation, assume that gyroscope 11 is at a temperature below its operating range so that the flotation fluid has a density greater than that of the float element. Considering that line B—B is vertically oriented, it is clear that the gyro float will be accelerated by the vertically oriented gravitational froce in a direction opposite of the gravitational vector, namely toward forcing elements 21 and 23. Accordingly, the gyro float will be moving away from forcing elements 25 and 27 and this movement will be sensed by pick-off or sensing coils 25s and 27s whereby a signal will be generated by coils 25c and 27c of the appropriate gyro centering amplifiers 342 and 343 causing forcing elements 25 and 27 to exert attractive forces on the gyro float which center the float.

As has been previously discussed, the signals from the gyro centering amplifiers 342 and 343 of forcing elements 25 and 27 are applied to amplifying circuit 39 so the heating element 45 will be actuated to deliver a substantial amount of heat. In this manner, the flotation fluid is heated to lessen the density of the flotation fluid so that the gyro float element will sink in the flotation fluid until it approaches the center position at which time the sensing coils of forcing elements 25 and 27 will no longer actuate heater 45 to generate heat. Thus, heater 45 will then be actuated only by the small current DC signal from source 43.

In the foregoing manner, the gyro float element through the concurrent control of the forcing elements and the heater circuit 41 will be brought to a point where the float is suspended in almost exact neutral buoyancy. It should be noted in this regard that when the gyro float reaches neutral suspension or buoyancy, little displacement of the float is experienced so that except for source 43 no power would be applied to the heating element. However, it has been found that during operation there is a small heat loss from the gyro to the surrounding area which if not compensated for, would continually remove the gyro float from neutral buoyancy. Accordingly, DC power source 43 is applied to heating element 45 through a variable resistance 47 which is adjusted to scale the DC signal to just compensate for heat loss so that once the gyro float is brought to neutral buoyancy it tends to stay in that condition.

In considering the operation of the invention, it should be considered that the process of placing the gyro float in neutral buoyancy is complicated by the fact that the required centering forces are functions of the total vehicle accelerations as well as the acceleration of gravity. However, in the case of ultra-precision gyros used in inertial platforms for manned aircraft such as transports and passenger planes, the accelerations other than gravity are of relatively short duration and can be smoothed out. For example, should the airplane bank or go into a dive of short duration so that an acceleration vector opposite to that of the gravitational vector is experienced by the gyro, it would have the same effect as if the flotation fluid were too hot. Hence, if this condition should occur at a time when the flotation fluid were too cold, adjustment of temperature would be postponed until the aircraft was again in level flight. However, this is not a problem since any such accelerations would be a very short duration in manned aircraft flight.

It should be noted in regard to the operation of the foregoing described embodiment of the invention, that there is a possibility upon the simultaneous happening of a number of events that the operation of the gyro might be effected by vehicle accelerations. For example, if a vehicle containing a gyroscope of the invention should experience a prolonged 2G dive at the same time that the flotation fluid was at a temperature in excess of that required for neutral buoyancy, the temperature of the flotation fluid would be increased instead of decreased by the density control circuit. Therefore, if the dive is prolonged sufficiently, the buoyant forces of the flotation fluid could exceed the restoring forces of the electromagnetic forces whereby the gyro float could hit against the gyro case.

In view of the foregoing, it is apparent that while the simplified embodiment of the invention is suitable for most applications, there are applications where the embodiment should be modified to allow it to operate more proficiently. For example, in the situation just described where the gyro float could under certain circumstances run away and hit the case, the gyroscope could be modified to incorporate a runaway sensing coil which could sense such a substantial departure of the gyroscope and reverse the operation of the flotation fluid density control system. Furthermore, in inertial platform applications, where externally applied accelerations other than the gravitational vector are of substantial duration, so that it cannot be determined with certainty whether the fluid should be heated or cooled, the gyroscope of the invention can be mechanized to operate in conjunction with the accelerometers mounted on the platform to compute a net resultant acceleration which is used as an input to a simple computer to sense the resultant acceleration vector with respect to the gyro frame of reference. Accordingly, with the direction of the resultant accelerometer determining and knowing the direction the float tends to move, it can be ascertained whether it is necessary to heat or cool the fluid to obtain neutral buoyancy. It should be apparent, of course, that gyroscopes of the invention modified as just described could be suitable for use in any vehicle regardless of the type of accelerations experienced by the vehicle.

As should be apparent, the embodiment of the invention described herein may be altered in many particulars without departing from the concepts of the present invention. For example, the flotation fluid density control circuits could be mechanized to utilize the top pair of forcing elements rather than the bottom pair as mentioned previously. In addition, the forcing elements could be mechanized to exert repelling forces as well as attracting forces. Accordingly, the spirit and scope of the present invention should be limited only by the scope of the appended claims.

What is claimed as new is:

1. In combination:
   a housing member;
   a spherical member positioned within said housing member;
   a flotation fluid filling said housing member and surrounding said spherical member, the mass of the flotation fluid displaced by said spherical member being substantially equal to the mass of said spherical member and varying with the temperature of the flotation fluid;
   signal generating means positioned between said housing member and said spherical member for generating a signal which is a measure of the displacement of said spherical member relative to said housing member;
   means for applying heat to said flotation fluid, connected to be directly responsive to said signal generating means to apply heat in direct proportion to said displacement to vary the buoyancy of said flotation fluid in a sense to cause said member to be placed in neutral buoyancy.

2. A device as recited in claim 1 and further comprising forcing apparatus positioned within said housing member, connected to be responsive to said signal to apply a force to said spherical member to force said spherical member toward a predetermined position relative to said housing member.

3. A device as recited in claim 1 in which said housing member is a housing member for a gyroscope and in which said spherical member is a float unit of said gyroscope.

4. A device as recited in claim 2 in which said housing member is a housing member for a gyroscope and in which said spherical member is a float unit of said gyroscope.

5. A device as recited in claim 4 in which said forcing means is a magnetic forcing apparatus positioned within said housing member and ferromagnetic means on the surface of said float unit to interact therewith and in which said signal generating means is a pickoff associated with each of said forcing means.

6. A device as recited in claim 5 in which said forcing apparatus and said ferromagnetic means are tetrahedrally spaced.

7. In a two-degree-of-freedom floated gyroscope, the combination comprising:
   a housing member;
   a spherical float member positioned within said housing member;
   a flotation fluid filling said housing member and surrounding said float member, the mass of the flotation fluid displaced by said float member being substantially equal to the mass of said float member and varying with the temperature of the flotation fluid;
   signal generating means coupled between said housing member and said float member for generating a signal which is a measure of the displacement of said float member relative to said housing member;
   electromagnetic forcing apparatus positioned within said housing member, connected to be responsive to said signal to apply a force to said float member to force said float member toward a predetermined position relative to said housing member; and
   a heating element, positioned to apply heat to said flotation fluid, and connected to apply said heat in response to said signal to vary the buoyancy of said flotation fluid in a sense to cause said float member to be forced toward a neutral buoyancy.

8. A device as recited in claim 7 in which said forcing apparatus comprises four magnetic coils tetrahedrally positioned on the interior of said housing and four ferromagnetic members tetrahedrally positioned on the exterior of said float member opposite said coils;
   and in which said signal generating means comprises four sensing coils concentrically positioned with said above mentioned forcing coils; and
   further comprising electrical amplifying means connected between said sensing coils and said forcing coils.

9. In an automatic temperature compensated flotation gyroscope, the combination comprising:
   a gyro housing;
   a spherical gyro float positioned within said housing;
   a flotation fluid filling said gyro housing and surrounding said float to support said float in substantially neutral suspension;
   a first servo loop, including position sensing means for sensing the relative position along a first axis, of said float in said housing, to concurrently vary the temperature of said flotation fluid and apply a magnetic force to cause said float to assume a predetermined position along said axis, within said housing;
   a plurality of additional servo loops, including a plurality of position sensing means for sensing the relative position, along a plurality of axes other than said first axis, of said float in said housing and a plurality of electromagnetic forcing means to apply forces along said axes to cause said float to assume a predetermined position, along said axes, within said housing.

10. In an automatic temperature compensated flotation gyroscope, the combination comprising:
   a gyro housing;
   a gyro float member positioned within said housing;
   a flotation fluid filling said housing and surrounding said float member, the density of the flotation fluid having a magnitude such that the mass of the fluid displaced by said float member is substantially equal to the mass of said float member to cause said float member to be in substantially neutral buoyancy;

translation detection apparatus positioned within said housing and coupled between said gyro housing and said float member for generating an actuating signal which is a measure of translational movement of said float member relative to said housing;

heating apparatus in thermal contact with said flotation fluid; and control means, connected to receive said signal, and to deliver a corresponding signal in direct proportion to said translational movement to said heating apparatus to cause the temperature of said flotation fluid to be altered to maintain said float member in neutral suspension.

11. The combination defined in claim 10 and further including additional forcing means, connected to be responsive to signals generated by said translation detection apparatus to exert a force between said gyro housing and said float member in a direction to compensate for displacement of said float member away from a predetermined position within said housing.

12. The combination comprising:

a gyro housing;

a gyro float having at least three axes defined thereon, positioned within said housing;

a flotation fluid filling said housing and surrounding said float for suspending said float in substantially neutral suspension;

at least one servo, including at least one signal generating means responsive to relative displacement between said housing and said float along one of said axes, to generate a signal which is a measure of said displacement, and including heater means responsive to said signal, in thermal contact with said flotation fluid to apply heat to said fluid as a proportional function of said displacement to maintain said float in a predetermined location within said housing.

13. The combination comprising:

a gyro housing;

a gyro float having at least three axes defined thereon, positioned within said housing;

a flotation fluid filling said housing and surrounding said float for suspending said float in substantially neutral suspension;

first displacement sensing means, coupled between said gyro housing and said gyro float to generate a signal which is a measure of relative displacement, along a first said axis, between said housing and said float;

means for applying heat to said flotation fluid; and coupling means, connected between said displacement sensing means and said means for applying heat, for applying said heat in direct proportion to said displacement, to control the temperature of the flotation fluid in a sense and magnitude to maintain said float in a neutrally buoyant condition.

14. The combination defined in claim 13 and further comprising:

a plurality of additional displacement sensing devices, coupled between said gyro housing and said float to generate signals which are measures of displacement between said gyro housing and float along said axes other than said first axis;

means for applying controlled forces between said gyro housing and said float along said axes; and coupling means between said displacement sensing means and said means for applying controlled forces to maintain said float in a predetermined position relative to said gyro housing.

References Cited

UNITED STATES PATENTS

| 2,854,850 | 10/1958 | Braddon | 74—5 |
| 2,937,533 | 3/1960 | Barkalow | 74—5.5 |
| 3,221,563 | 12/1965 | Wing | 74—5 X |
| 3,237,458 | 3/1966 | Rocks | 74—5 |

FRED C. MATTERN, JR., *Primary Examiner.*

PALMER W. SULLIVAN, *Examiner.*

C. J. HUSAR, J. D. PUFFER, *Assistant Examiners.*